(12) United States Patent
Kaupert

(10) Patent No.: US 8,573,968 B2
(45) Date of Patent: Nov. 5, 2013

(54) WALL STRUCTURE AND BURNER AS WELL AS SYSTEM

(75) Inventor: Andreas Kaupert, Esslingen (DE)

(73) Assignee: Eberspächer Climate Control Systems GmbH & Co. KG, Esslingen (DE)

(*) Notice: Subject to any disclaimer, the term of this patent is extended or adjusted under 35 U.S.C. 154(b) by 1221 days.

(21) Appl. No.: 12/418,807

(22) Filed: Apr. 6, 2009

(65) Prior Publication Data

US 2009/0263757 A1 Oct. 22, 2009

(30) Foreign Application Priority Data

Apr. 21, 2008 (DE) .......................... 10 2008 019 854

(51) Int. Cl.
*F23D 14/12* (2006.01)

(52) U.S. Cl.
USPC ............................. 431/350; 431/328; 431/326

(58) Field of Classification Search
USPC ........................ 431/354, 328, 326, 2, 350, 351
See application file for complete search history.

(56) References Cited

U.S. PATENT DOCUMENTS

| | | | |
|---|---|---|---|
| 5,292,246 A | 3/1994 | Gateau et al. | |
| 7,077,643 B2 * | 7/2006 | Holladay et al. | 431/215 |
| 2005/0142507 A1 * | 6/2005 | Sugimoto et al. | 431/7 |
| 2005/0158683 A1 * | 7/2005 | Eberspach | 431/354 |
| 2007/0003896 A1 * | 1/2007 | Kaupert et al. | 431/350 |

FOREIGN PATENT DOCUMENTS

| | | |
|---|---|---|
| DE | 20 31 002 B2 | 1/1971 |
| DE | 2 034 352 A | 4/1971 |
| DE | 29512231 U1 | 11/1996 |
| DE | 695 03 581 T2 | 1/1999 |
| DE | 199 39 731 A1 | 2/2001 |
| DE | 102004033545 | 2/2006 |
| DE | 102004037689 A1 | 3/2006 |
| DE | 102006010375 | 9/2007 |
| DE | 102006046053 A1 | 4/2008 |
| EP | 03 34 736 A1 | 9/1989 |

* cited by examiner

*Primary Examiner* — Thomas Denion
*Assistant Examiner* — Brian Inacay
(74) *Attorney, Agent, or Firm* — McGlew and Tuttle, P.C.

(57) ABSTRACT

A wall structure (21) for a burner (19), with a first wall (40), which has elevations (41) and which defines a first supply chamber (22), and with a second wall (43), which has recesses (44) cooperating with end sections (42) of the elevations (41) and which defines a reaction chamber (20). The first wall (40) has first openings (34), which connect the first supply chamber (23) to the reaction chamber (20). The second wall (43) has second openings (37), which connect a second supply chamber (24) located between the walls (40, 43) to the reaction chamber (20). The first openings (34) are arranged in first rows (35) and the second openings (37) in second rows (38). The mixture formation or homogenization of the gases in the reaction chamber (20) can be improved if at least one second opening (37) is arranged within the first row (35) between two openings (34).

20 Claims, 4 Drawing Sheets

US 8,573,968 B2

WALL STRUCTURE AND BURNER AS WELL AS SYSTEM

CROSS REFERENCE TO RELATED APPLICATIONS

This application claims the benefit of priority under 35 U.S.C. §119 of German Patent Application DE 10 2008 019 854.4 filed Apr. 21, 2008, the entire contents of which are incorporated herein by reference.

FIELD OF THE INVENTION

The present invention pertains to a wall structure for defining a reaction chamber of a burner. The present invention pertains, besides, to a burner equipped with such a wall structure as well as to a system with such a burner.

BACKGROUND OF THE INVENTION

A gaseous oxidant is burned with a gaseous fuel by means of such a burner in a combustion reaction taking place in the reaction chamber. Such a burner may be used, e.g., in a fuel cell, to burn an anode waste gas containing hydrogen gas with a cathode waste gas containing oxygen gas in order to reduce undesired pollutant emissions of the fuel cell. Such a fuel is known, e.g., from DE 10 2004 033 545.

It is essential for such a burner that the oxidant gas and the fuel gas are fed separately into the reaction chamber in order for the highly reactive gases to react with one another in the reaction chamber only. A wall structure of the burner, which defines the reaction chamber at least on one side, has first openings for this for feeding one gas and second openings, which are separate therefrom, for feeding the second gas. Such a wall structure is known, e.g., from DE 10 2006 010 375.

SUMMARY OF THE INVENTION

The object of the present invention is to provide an improved embodiment for a wall structure or for a burner or for a fuel cell system of the type mentioned above, which embodiment is characterized especially in that improved homogenization of the mixture being formed in the reaction chamber becomes established already when the gases are flowing into the reaction chamber.

The present invention is based on the general idea of equipping a first wall for defining a first supply chamber with elevations, which contain at least one first opening. At the same time, a second wall is provided, which contains recesses as well as second openings and defines, together with the first wall, a second supply chamber, on the one hand, and defines a reaction chamber, on the other hand. The walls are arranged at each other such that end sections of the elevations of the first wall cover or close the recesses of the second wall, so that the first openings in the area of the recesses connect the first supply chamber to the reaction chamber. The first openings are arranged in parallel to a longitudinal direction in rows, which are located at spaced locations from one another in relation to a transverse direction, which also applies to the recesses. At the same time, at least one row of second openings is arranged each between two adjacent rows of first openings. In addition, at least one second opening each is arranged within the respective longitudinal row of the first openings between two adjacent first openings. It is achieved as a result that the gas fed via the first openings is laterally bordered by the other gas in the two directions, which are at right angles to one another and extend at right angles to the direction of flow of the gases, as a result of which concentration of the first gas can be avoided and homogenization of the mixture being formed in the reaction chamber can be improved.

An embodiment in which the elevations of the first wall are of a pyramidal or conical or cuboid or cylindrical shape is especially advantageous. Such elevations can be prepared within the first wall, e.g., by deep-drawing or casting.

Other important features and advantages of the present invention appear from the subclaims, from the drawings and from the corresponding description of the figures based on the drawings.

It is apparent that the above-mentioned features, which will still be explained below, can be used not only in the particular combination indicated, but in other combinations or alone as well without going beyond the scope of the present invention.

Preferred exemplary embodiments of the present invention are shown in the drawings and will be explained in more detail below, using identical reference numbers for identical or similar or functionally similar components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
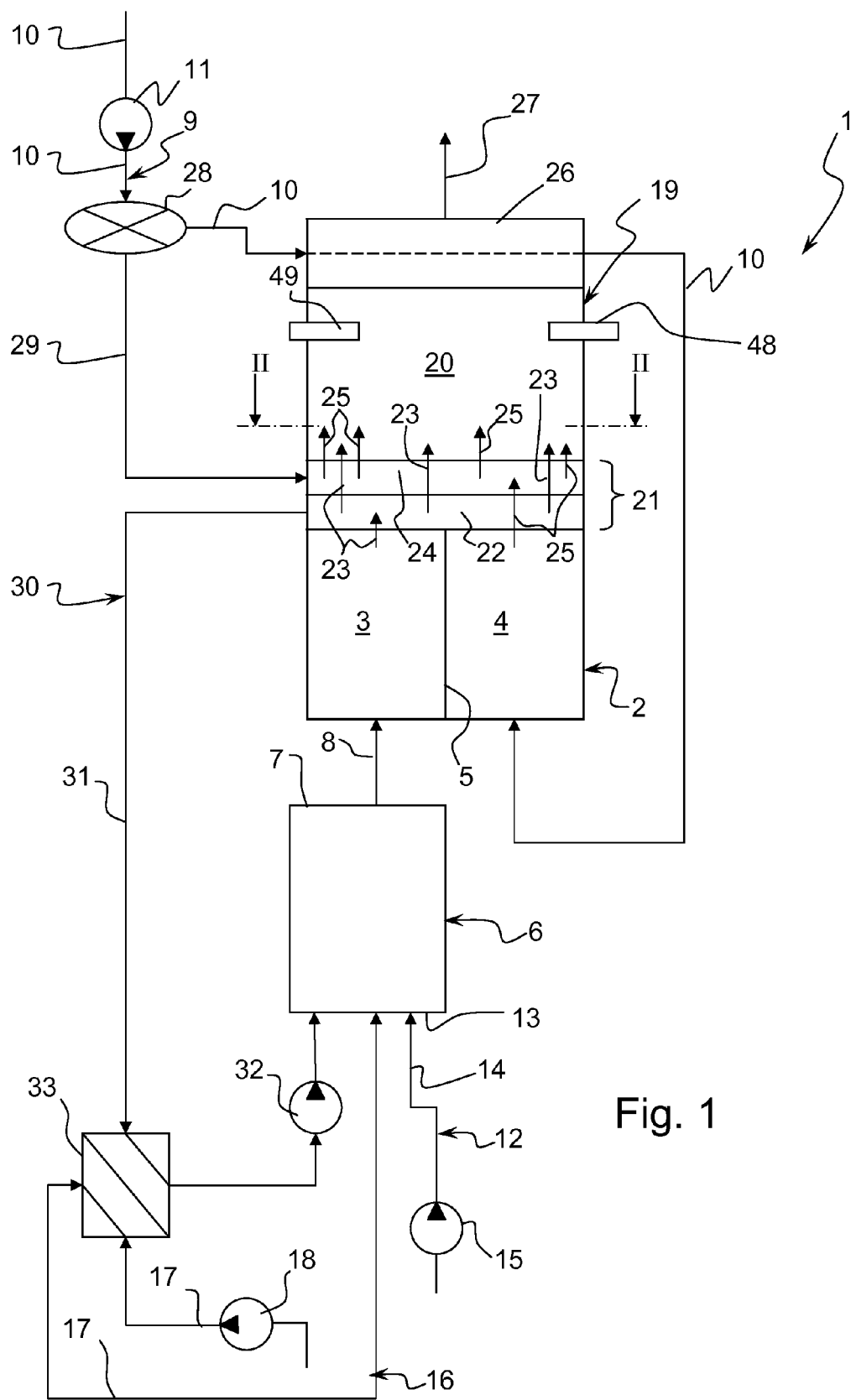
FIG. 1 is a simplified circuit diagram-like basic schematic view of a fuel cell system according to the invention.

Referring to the drawings in particular, corresponding to FIG. 1, a fuel cell system 1 comprises a fuel cell 2, which is used in the usual manner to generate electrical current and reacts an anode waste gas containing hydrogen gas with a cathode gas containing oxygen gas in the process. The fuel cell 2 has an anode side 3 as well as a cathode side 4 for this, which are separated from one another via an electrolyte 5. The fuel cell 2 usually consists of a stack of individual fuel cell elements, which have an anode side 3 each, which is separated from the cathode side 4 by the electrolyte 5.

The fuel cell system 1 comprises a reformer 6, which is designed such that it can generate a fuel gas containing hydrogen gas, which fuel gas can be fed as an anode gas, e.g., to the fuel cell 2. An outlet side 7 of the reformer 6 is connected for this to the anode side 3 of the fuel cell 2 via an anode gas line 8. As an alternative, a hydrogen tank, which makes available hydrogen in the liquid or gaseous form, may also be provided instead of the reformer 6. The stored hydrogen can be fed as an anode gas to the fuel cell 2 on the anode side.

To supply the fuel cell 2 with cathode gas, which is preferably air, a first air supply means 9 is provided, which has a cathode gas line 10 connected to the cathode side 4. A delivery means 11, for example, a pump or a fan, is arranged in the cathode gas line 10 to drive the cathode gas.

Reformer 6 generates the anode gas from an oxidant, which is preferably air, and a fuel, which is a hydrocarbon, e.g., diesel fuel, gasoline, biodiesel or any other synthetic fuel. The fuel cell system 1 may be preferably located in a motor vehicle and form an additional current source or the only current source there. Reformer 6 is preferably supplied for this with the fuel, with which an internal combustion engine of the vehicle is also operated. To supply the reformer 6 with fuel, a fuel supply means 12 is provided, which is, e.g., a pump and has a fuel line 14 connected to the inlet side 13 of the reformer 6 as well as a delivery means 15 integrated within the fuel line 14. A second air supply means 16, which may be a fan and comprises an oxidant line 17 connected to the inlet side 13 of reformer 6 and a delivery means 18 arranged in the oxidant line 17, is provided for supplying the reformer 6 with oxidant, i.e., preferably with air.

The fuel cell system 1 has, besides, a residual gas burner 19 here, which will hereinafter be called burner 19 for short. Burner 19 contains a reaction chamber 20 and is used to burn the anode waste gas with cathode waste gas of the fuel cell 2. Depending on the current production of the fuel cell 2, the anode waste gas contains more or less hydrogen gas, while the cathode waste gas has an oxygen content that depends on the current production of the fuel cell 2. To avoid the emission of hydrogen gas as well as of carbon monoxide into the environment, anode waste gas is reacted with cathode waste gas in burner 19.

Burner 19 has a wall structure 21, which defines the reaction chamber 20 on one side. This wall structure 21 is integrated here structurally in an outlet side of the fuel cell 2. For example, wall structure 21 forms an end plate of the stacked, plate-like fuel cell elements. A structural unit comprising the fuel cell 2 and the burner 19 is obtained as a result. The wall structure 21 contains a first supply chamber 22, into which the anode waste gas enters and from which the anode waste gas reaches the reaction chamber 20. This anode gas flow is symbolized by arrows 23 in FIG. 1. Furthermore, wall structure 21 contains a second supply chamber 24, into which the cathode waste gas is introduced and from which the cathode waste gas reaches the reaction chamber 20. A corresponding cathode waste gas flow is indicated by arrows 25 in FIG. 1.

Opposite the wall structure 21, which forms the inlet side of burner 19, burner 19 has a heat exchanger 26, which forms as a result an outlet side of burner 19. Heat exchanger 26 defines the reaction chamber 20 against the wall structure 21 and combustion waste gases or burner waste gases are correspondingly admitted to it. These burner waste gases are led away from the burner 19 via a corresponding waste gas line 27. The heat exchanger 26 is integrated within the cathode gas line 10. Waste heat of the burner waste gas can be utilized as a result to heat the cathode gas.

Burner 19 may be optionally equipped with an igniting means 48, e.g., with a spark plug or glow plug. A temperature sensor 49 may be optionally provided in order to monitor the overheating of burner 19 or the combustion process; for example, temperature sensor 49 is used as a flame failure safeguard.

Heat exchanger 26 may be provided with a catalytically active coating in the waste gas path in an especially advantageous embodiment, as a result of which it additionally acts as an oxidation catalyst.

The first air supply means 9 has here, as an example, a valve means 28, by means of which a cooling gas flow can be branched off via a cooling gas line 29 from the cathode gas line 10 and can be fed into the second supply chamber 24.

Furthermore, the fuel cell system 1 is equipped here with a recycling means 30, by means of which anode waste gas can be recycled to the reformer 6. The recycling means 30 has a return line 31 for this, which is connected on the inlet side, for example, to the first supply chamber 20, and which is connected on the outlet side to the inlet side 13 of reformer 6. The return line 31 contains a delivery means 32, e.g., a pump, a compressor or a fan. Furthermore, another heat exchanger 33 is provided, which is integrated, on the one hand, in the return line 31 and, on the other hand, in the oxidant line 17. The returned anode waste gas can be cooled by means of this heat exchanger 33 upstream of the delivery means 32 to the extent that a risk of damage to the delivery means 32 can be ruled out. However, the heat of the returned anode waste gas can be fed at the same time to reformer 6 via the oxidant gas.

Burner 19 may also be used in another system without a fuel cell 2, e.g., with the reformer 6 or with a hydrogen tank, the latter being located, e.g., in a hydrogen-powered vehicle, whose internal combustion engine is operated with hydrogen gas.

Figure 2:
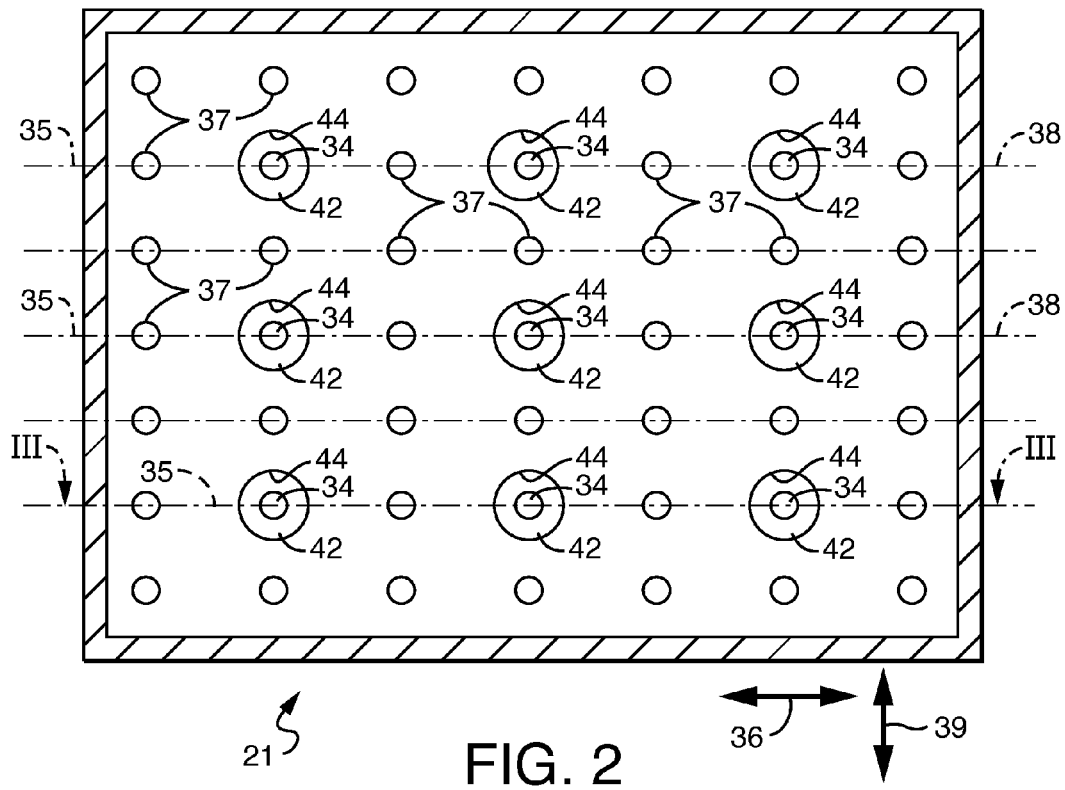
FIG. 2 is a sectional view of a burner corresponding to section lines II in FIG. 1.

Corresponding to FIG. 2, the wall structure 21 has a plurality of first openings 34, through which the anode waste gas reaches the reaction chamber 20 from the first supply chamber 22. These first openings 34 are arranged in a plurality of straight first rows 35, which are indicated by broken lines here. These first rows 35 extend in parallel to a longitudinal direction 36.

Furthermore, the wall structure 21 has a plurality of second openings 37, through which the cathode waste gas reaches the reaction chamber 20 from the second supply chamber 24. The second openings 37 are arranged in a plurality of straight second rows 38, which are again indicated by broken lines in FIG. 2. The second rows 38 also extend in parallel to the longitudinal direction 36, and they are also arranged between two adjacent first rows 35 each in relation to a transverse direction 39 extending at right angles to the longitudinal direction 36. It is remarkable now that additional second openings 37, which are arranged between two first openings 34 located adjacent each in the longitudinal direction, are present within the first rows 35. As a result, every individual first opening 34 for anode waste gas is adjacent to a second opening 37 for cathode waste gas in both the longitudinal direction 36 and in the transverse direction 39. Each first opening 34 is correspondingly bordered laterally by two openings 37 in a plane defined by the longitudinal direction 36 and the transverse direction 39.

Figure 3:
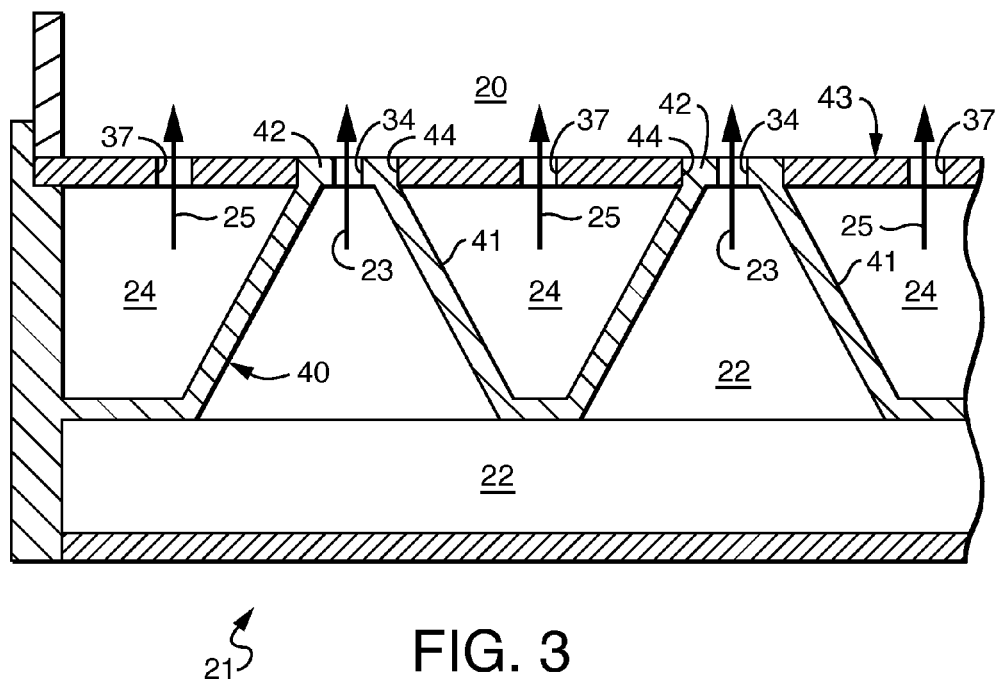
FIG. 3 is a sectional view of the burner corresponding to section lines III in FIG. 2.

Corresponding to FIGS. 2 and 3, the wall structure 21 comprises a first wall 40, which defines the first supply chamber 22 in the installed state on a rear side of the wall structure 21 facing away from the reaction chamber 20. The first wall 40 has a plurality of elevations 41. These elevations 41 may have a conical shape. The elevations 41 may likewise be pyramidal with a triangular or tetragonal cross section or a cross section formed by a polygon having any desired number of corners. Furthermore, the elevations 41 may also be cylindrical or cuboid. The first wall 40 contains the first openings 34, doing so in the area of end sections 42 of the elevations 41.

Furthermore, the wall structure 21 has a second wall 43, which contains the second openings 37. Furthermore, the second wall 43 contains a plurality of recesses 44, which are respective perforations and which are closed by the respective end sections 42 of the elevations 41. Together with the end sections 42 on a front side of the wall structure 21 facing the reaction chamber 20, the second wall 43 forms a limitation of the reaction chamber 20. The second reaction chamber 24 is formed between the first wall 40 and the second wall 43.

Corresponding to FIG. 2, recesses 44 form a round cross section in this example. It is clear that rectangular or any other desired cross sections are also conceivable in other embodiments.

In the embodiment shown in FIG. 3, the end sections 42 of the elevations 41 are made complementary in respect to their circumferential contour to the cross sections of recesses 44. It is possible as a result to plug the end sections 42 into the recesses 44 such that they fill these out and seal them as a result. In other words, the end sections 42 mesh with the recesses 44. This meshing preferably takes place such that the end sections 42 are flush with the second wall 43 on the front side of wall structure 21 facing the reaction chamber 20.

Figure 4:
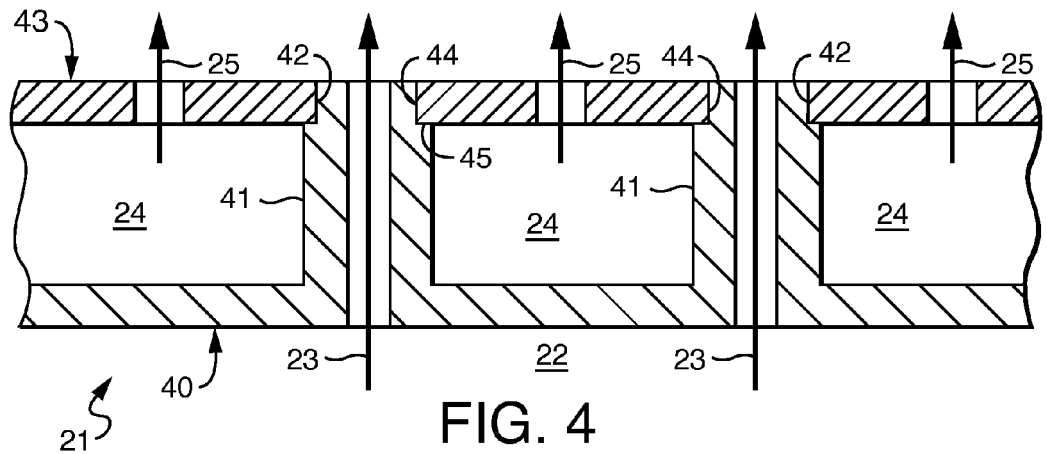
FIG. 4 is a sectional view of a different embodiment of a burner with a view as in FIG. 3.

FIG. 4 shows an example in which the elevations 41 are cylindrical or cuboid. Furthermore, a step 45 is provided here, by which the particular end section 42 is offset from the rest of the elevation 41. The second plate 43 can come into contact with this step 45. At the same time, step 45 facilitates the establishment of a tight connection between the elevations 41 and the second plate 43. The end sections 42 mesh with the respective recess 44 flush in this case as well.

Figure 5:
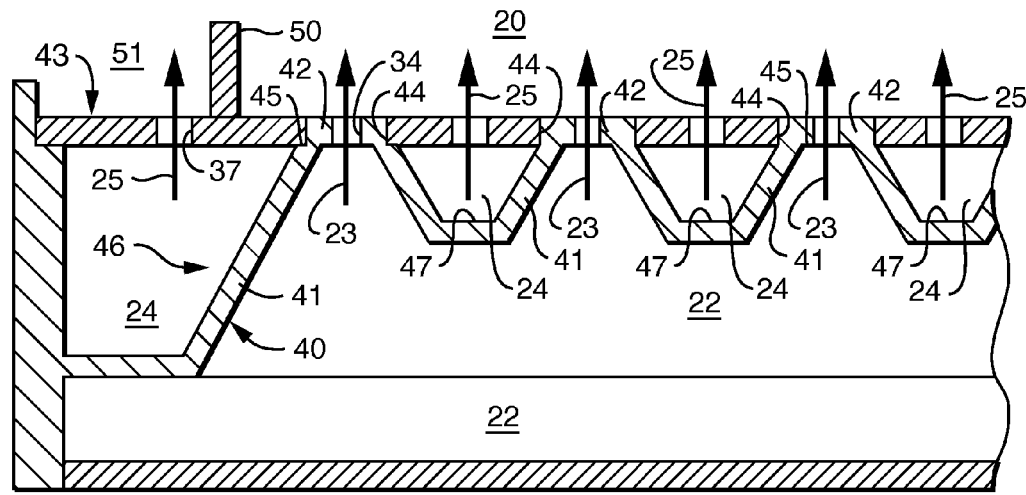
FIG. 5 is a sectional view of a different embodiment of a burner with a view as in FIG. 3.

While the elevations 41 are formed individually in the embodiments according to FIGS. 3 and 4, FIG. 5 shows an embodiment in which the elevations 41 are designed as a group 46. Section plane III-III in FIGS. 3 through 6 extends through one of the first rows 35 or coincides with same. Such a group of elevations 46 can be embodied, e.g., by the first wall 40 having a wave-shaped profile or a peak-and-valley profile in a section plane that extends in parallel to the transverse direction, the peak sections forming such a group of elevations 46 each. A depression 47 is formed between two end sections 42 located adjacent in the longitudinal direction 36 within the respective group of elevations 46, which thus extends in the longitudinal direction 36 and forms a first row 35 each as a result. These depressions 47 are dimensioned such that the first wall 40 is located at a spaced location from the second wall 43 in the area of the respective depression 47. Furthermore, the particular depression 47 is designed as a continuous depression in the transverse direction 39. As a result, the two valley sections of the peak-and-valley profile communicate with one another via the respective depression 47, which are separated from one another by the peak section, which forms the group of elevations 46. The second openings 37 arranged in the second wall 43 in the area of the depressions 47 correspondingly communicate with the second supply chamber 34.

FIG. 5 shows as an example a partition 50, which separates the reaction chamber 20 from a cooling chamber 51, through which only the cathode waste gas 25 or a cooling gas-cathode waste gas mixture flows and which defines the reaction chamber 20 on one side or on a plurality of sides and especially surrounds same laterally.

Figure 6:
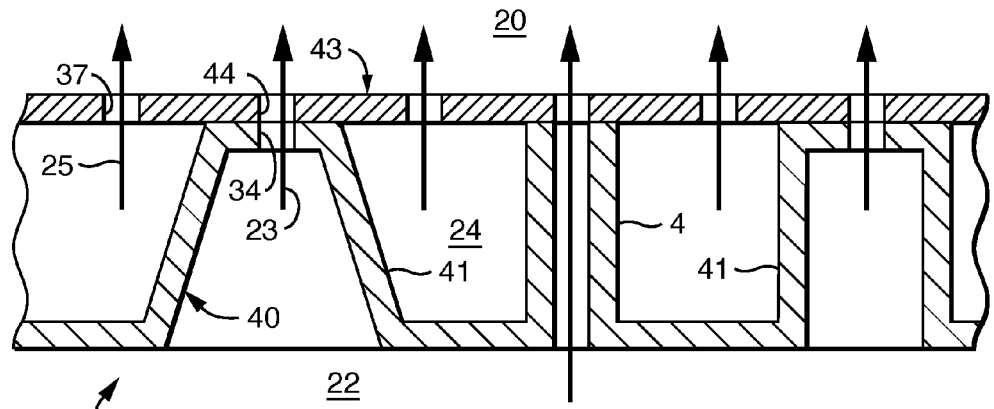
FIG. 6 is a sectional view of a different embodiment of a burner with a view as in FIG. 3.

While the end sections 42 of the elevations 41 cooperate in the embodiments according to FIGS. 2 through 5 with the recesses 44 such that they mesh with the corresponding recesses 44, FIG. 6 shows an embodiment in which the end sections 42 have a surface that faces the second wall 43 and is larger than the cross-sectional area of the respective recess 44. As a consequence, the end sections 42 cooperate here with the recesses 44 such that the end sections 42 are in contact in this embodiment by their respective surface with an underside of the second wall 43, which said underside faces the first wall 40. The recesses 44 are covered by the end sections 42 as a result. The first openings 34 of the first wall 40 are now aligned with the recesses 44 of the second wall 43. In particular, the first openings 34 and the recesses 44 may have equal cross sections. FIG. 6 shows, in addition, examples of different geometries for the elevations 41.

Figure 7:
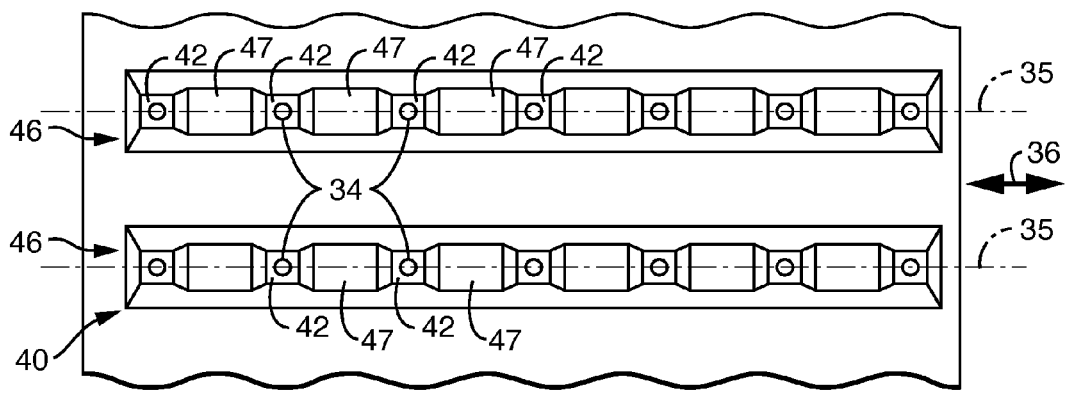
FIG. 7 is a top view of a first wall of a wall structure.

FIG. 7 shows a top view of the first wall 40 when viewed from the second wall 43 or when viewed from the reaction chamber 20 with the second wall 43 removed. The first wall 40 shows in the detail shown two groups of elevations 46, which extend each in the longitudinal direction 36 and form a first row 35 each. As can be recognized, a depression 47 each is formed in the longitudinal direction 36 between two end sections 42 each. While the end sections 42 contain a first opening 34 each, depressions 47 are made without openings.

Figure 8:
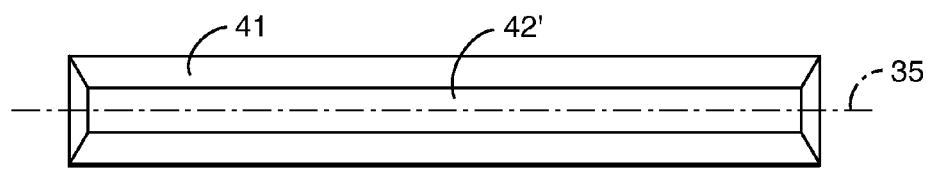
FIG. 8 is a top view of a part of a wall from FIG. 7 in one of different states of manufacture.
Figure 9:
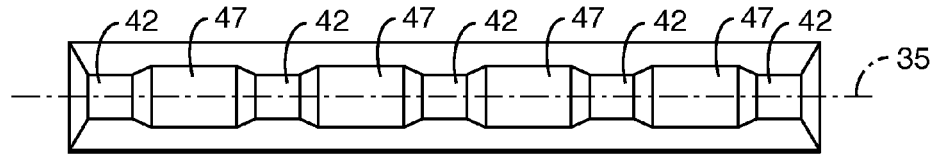
FIG. 9 is a top view of a part of a wall from FIG. 7 in another of different states of manufacture.

Corresponding to an advantageous embodiment, the first wall 40 may be prepared, for example, as follows:

Corresponding to FIG. 8, continuous elevations 41', which extend in parallel to the longitudinal direction 36 over the entire length of the respective first row 35, are prepared in a first process step. However, only one such first row 35 is shown in FIGS. 8 through 9. This continuous elevation 41' correspondingly also has an end section 42' that passes through.

Corresponding to FIG. 9, a deformation, which forms the depressions 47, is performed in a second process step. The passing-through end section 42', which is still present in the state according to FIG. 8, is divided as a result into a plurality of end sections 42 in the longitudinal direction 36. The individual elevations 41 are correspondingly also separated as a result from one another.

Figure 10:
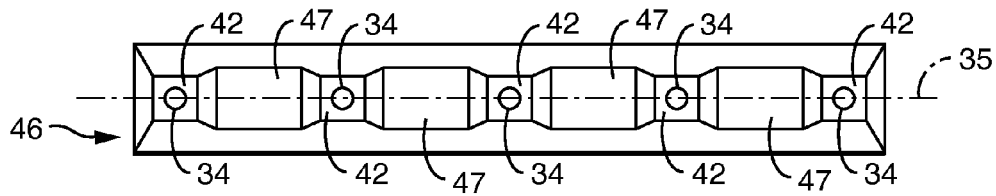
FIG. 10 is a top view of a part of a wall from FIG. 7 in another of different states of manufacture.

Corresponding to FIG. 10, the first openings 34 can be prepared in the area of the end sections 42 in a third process step. It is clear that the first openings 34 can also be prepared with the depressions 47 during the second process step. Furthermore, it is also possible to provide the first openings 34 already in the first step.

While specific embodiments of the invention have been shown and described in detail to illustrate the application of the principles of the invention, it will be understood that the invention may be embodied otherwise without departing from such principles.

What is claimed is:

1. A wall structure for a burner of a fuel cell system, the wall structure comprising:
    a first wall having elevations, said first wall defining a first supply chamber in an installed state on a rear side of the wall structure;
    a second wall having recesses covered or closed with end sections of said elevations, said second wall defining a reaction chamber on a front side of the wall structure in an installed state, wherein:
    a second supply chamber is formed between said first wall, said first supply chamber not being in communication with said second supply chamber,
    said second wall and said first wall has, in said end sections and in an area of said recesses, first openings connecting said first supply chamber to said reaction chamber in the installed state, said second wall has second openings connecting said second supply chamber to said reaction chamber in the installed state, said first openings are arranged in a plurality of linear first rows, which extend in parallel to a longitudinal direction, said second openings are arranged in a plurality of linear second rows, which extend in parallel to the longitudinal direction and which are arranged in a transverse direction, between two adjacent first rows, and at least one of said elevations and said end sections is designed such that at least one second opening is arranged within the respective first row between two adjacent first openings.

2. A wall structure in accordance with claim 1, wherein at least one of the elevations has a pyramidal or conical or cuboid or cylindrical shape.

3. A wall structure in accordance with claim 1, wherein:
at least one group of elevations extending along the first row is provided at least at a first row;
individual said elevations in said at least one group of elevations are separated from one another by a plurality of depressions located at spaced locations from one another in the longitudinal direction; and
said depressions are dimensioned such that said first wall is located at a spaced location therein from said second wall.

4. A wall structure in accordance with claim 1, wherein at least some of said end sections have a round or rectangular cross section.

5. A wall structure in accordance with claim 1, wherein the end sections are made complementary in terms of a circumferential contour to a cross section of said recesses in such a way that said end sections mesh with said recesses, said first openings and said first supply chamber defining an anode waste gas flow path, wherein said reaction chamber receives anode waste gas via said anode waste gas flow path, said second supply chamber and said second openings defining a cathode gas flow path, wherein said reaction chamber receives cathode waste gas via said cathode gas flow path, said cathode waste gas flow path being separate from said anode waste gas flow path.

6. A wall structure in accordance with claim 5, wherein at least some of said end sections mesh flush with respective said recesses, said at least one second opening being aligned with said two adjacent first openings, wherein said at least one second opening and said two adjacent first openings are arranged in a same plane.

7. A wall structure in accordance with claim 1, wherein said end sections each have a surface facing said second wall, said surface being larger than a cross-sectional area of respective said recesses, whereby said end sections are in contact with the respective said surface with an underside of said second wall, which said underside faces said first wall.

8. A burner for a fuel cell system, the burner comprising:
a wall structure comprising:
a first wall having elevations, each of said elevations comprising a non-porous first wall portion, said non-porous first wall portion extending continuously, without interruption, said first wall defining a first supply chamber in an installed state on a rear side of the wall structure;
a second wall having recesses covered or closed with end sections of said elevations, said second wall defining a reaction chamber on a front side of the wall structure in an installed state, wherein:
a second supply chamber is formed between said first wall and said non-porous portion first wall portion of each of said elevations,
said non-porous first wall portion of each of said elevations define at least a portion of said first supply chamber,
communication between said first supply chamber and said second supply chamber is blocked via at least said non-porous first wall portion of each of said elevations,
said second wall and said first wall has, in said end sections and in an area of said recesses, first openings connecting said first supply chamber to said reaction chamber in the installed state,
said second wall has second openings connecting said second supply chamber to said reaction chamber in the installed state,
said first openings are arranged in a plurality of linear first rows, which extend in parallel to a longitudinal direction,
said second openings are arranged in a plurality of linear second rows, which extend in parallel to the longitudinal direction and which are arranged in a transverse direction, between two adjacent first rows, and
at least one of said elevations and said end sections is designed such that at least one second opening is arranged within the respective first row between two adjacent first openings.

9. A burner in accordance with claim 8, wherein said reaction chamber is defined against said wall structure by a heat exchanger with a catalytically active coating on a side exposed to the waste gas of the burner.

10. A burner in accordance with claim 8, further comprising an igniting means comprising at least one of a spark plug, glow plug and a temperature sensor associated with said reaction chamber.

11. A burner in accordance with claim 8, wherein said wall structure forms an outlet-side end plate of the fuel cell, said at least one second opening being aligned with said two adjacent first openings, wherein said at least one second opening and said two adjacent first openings are arranged in a same plane, said first openings and said first supply chamber defining an anode waste gas flow path, wherein said reaction chamber receives anode waste gas via said anode waste gas flow path, said second supply chamber and said second openings defining a cathode waste gas flow path, wherein said reaction chamber receives cathode waste gas via said cathode waste gas flow path.

12. A motor vehicle burner system, comprising:
a burner with a wall structure comprising:
a first wall having elevations, each of said elevations extending continuously, without interruption, said first wall defining a first supply chamber in an installed state on a rear side of the wall structure, at least one of said elevations defining at least a portion of said first supply chamber;
a second wall having recesses covered or closed with end sections of said elevations, said second wall defining a reaction chamber on a front side of the wall structure in an installed state, wherein:
a second supply chamber is defined between said first wall and at least one of said elevations,
said at least one of said elevations defines a non-porous barrier structure,
communication between said first supply chamber and said second supply chamber is prevented via at least said non-porous barrier structure;
said second wall and said first wall has, in said end sections and in an area of said recesses, first openings connecting said first supply chamber to said reaction chamber in the installed state, said second wall has second openings connecting said second supply chamber to said reaction chamber in the installed state, said first openings are arranged in a plurality of linear first rows, which extend in parallel to a longitudinal direction, said second openings are arranged in a plurality of linear second rows, which extend in parallel to the longitudinal direction and which are arranged in a transverse direction, between two adjacent first rows, and at least one of said elevations and said end sections is designed such that at least one second opening is arranged within the respective first row between two adjacent first openings; and a device connected to said burner, said device including at least one of:

a fuel cell for generating electric current from anode gas and cathode gas, a reformer for generating anode gas from fuel and oxidant; and a hydrogen tank, especially of a vehicle operated with hydrogen, for providing anode gas.

13. A system in accordance with claim 12 wherein at least one of the elevations has a pyramidal or conical or cuboid or cylindrical shape.

14. A system in accordance with claim 12, wherein:

at least one group of elevations extending along the first row is provided at least at a first row;

individual said elevations in said at least one group of elevations are separated from one another by a plurality of depressions located at spaced locations from one another in the longitudinal direction; and said depressions are dimensioned such that said first wall is located at a spaced location therein from said second wall.

15. A system in accordance with claim 12, wherein at least some of said end sections have a round or rectangular cross section.

16. A system in accordance with claim 12, wherein the end sections are made complementary in terms of a circumferential contour to a cross section of said recesses in such a way that said end sections mesh with said recesses, said first openings and said first supply chamber defining an anode waste gas flow path, wherein said reaction chamber receives anode waste gas via said anode waste gas flow path, said second supply chamber and said second openings defining a cathode waste gas flow path, wherein said reaction chamber receives cathode waste gas via said cathode waste gas flow path.

17. A system in accordance with claim 16, wherein at least some of said end sections mesh flush with respective said recesses, said at least one second opening being aligned with said two adjacent first openings, wherein said at least one second opening and said two adjacent first openings are arranged in a plane.

18. A burner in accordance with claim 12, wherein said reaction chamber is defined against said wall structure by a heat exchanger with a catalytically active coating on a side exposed to the waste gas of the burner.

19. A burner in accordance with claim 12, further comprising an igniting means comprising at least one of a spark plug, glow plug and a temperature sensor associated with said reaction chamber.

20. A burner in accordance with claim 12, wherein said wall structure forms an outlet-side end plate of the fuel cell.

* * * * *